United States Patent
Dahmani et al.

(10) Patent No.: US 6,323,896 B1
(45) Date of Patent: Nov. 27, 2001

(54) HOLOGRAPHIC DEVICE FOR FORMATION OF LIGHT BEAMS WITH PREDETERMINED SPECTRAL COMPOSITIONS AND PROJECTOR OF VIDEO IMAGES CONTAINING SUCH A DEVICE

(75) Inventors: Brahim Dahmani, Montrouge (FR); Alexander Galpern; Vitaly Sukhanov, both of St. Petersburg (RU)

(73) Assignee: Corning Precision Lens, Cincinnati, OH (US)

( * ) Notice: Subject to any disclaimer, the term of this patent is extended or adjusted under 35 U.S.C. 154(b) by 0 days.

(21) Appl. No.: 09/355,587

(22) PCT Filed: Feb. 3, 1998

(86) PCT No.: PCT/US98/02144

§ 371 Date: Oct. 1, 1999

§ 102(e) Date: Oct. 1, 1999

(87) PCT Pub. No.: WO98/35264

PCT Pub. Date: Aug. 13, 1998

(30) Foreign Application Priority Data

Feb. 7, 1997 (FR) ................................................ 97 01444

(51) Int. Cl.[7] ............................ H04N 9/31; H04N 15/00; H04N 13/00
(52) U.S. Cl. ............................ 348/41; 348/751; 348/757; 359/15
(58) Field of Search ................................. 348/40, 41, 42, 348/751, 757; 359/15, 630, 634; 353/31; H04N 13/00, 15/00

(56) References Cited

U.S. PATENT DOCUMENTS

| 4,040,726 | 8/1977 | Paca . | |
|---|---|---|---|
| 4,715,683 | * 12/1987 | Gregory et al. | 348/40 |
| 4,807,978 | * 2/1989 | Grinberg et al. | 348/41 |
| 5,117,296 | * 5/1992 | Hoebing | 348/41 |
| 5,172,222 | * 12/1992 | Plantier et al. | 348/751 |
| 5,267,060 | 11/1993 | Colton . | |
| 5,404,234 | * 4/1995 | Taniguchi et al. | 348/41 |
| 5,784,181 | 7/1998 | Loiseaux et al. . | |

FOREIGN PATENT DOCUMENTS

| 0 166 194 | 1/1986 | (EP) . |
| WO 90/15367 | 12/1990 | (WO) . |

OTHER PUBLICATIONS

Loiseaux et al., "Compact Spatio–Chromatic Single–LCD Projection Architecture," *Asia Display '95*, Proceedings of the Fifteenth International Display Research Conference, publication S7–4, Hamamatsu, Japan, Oct. 16–18, 1995.

\* cited by examiner

*Primary Examiner*—Howard Britton
(74) *Attorney, Agent, or Firm*—Maurice M. Klee

(57) ABSTRACT

The device includes a) flat mirror (7) formed by adjacent areas ($5_i$, $6_i$) that are alternately transparent and reflecting with parallel and straight lines of demarcation, b) identical first (4) and second (4') reflection holograms, each delivering at least one diffracted beam with a predetermined spectral composition, c) illuminating source (1) for illuminating said holograms (4, 4') at normal incidence by the intermediary of said mirror (7), said holograms (4, 4') being arranged symmetrically with respect to the plane of said mirror (7) in such a way as to be illuminated by the intermediary of transparent ($6_i$) and reflecting ($5_i$) strips, respectively, of mirror (7), and in such a way that the beams diffracted by the first and second holograms are reflected and transmitted, respectively, by reflecting ($5_i$) and transparent ($6_i$) strips, respectively, of mirror (7), in order to be combined into a continuous light beam with said spectral composition.

15 Claims, 2 Drawing Sheets

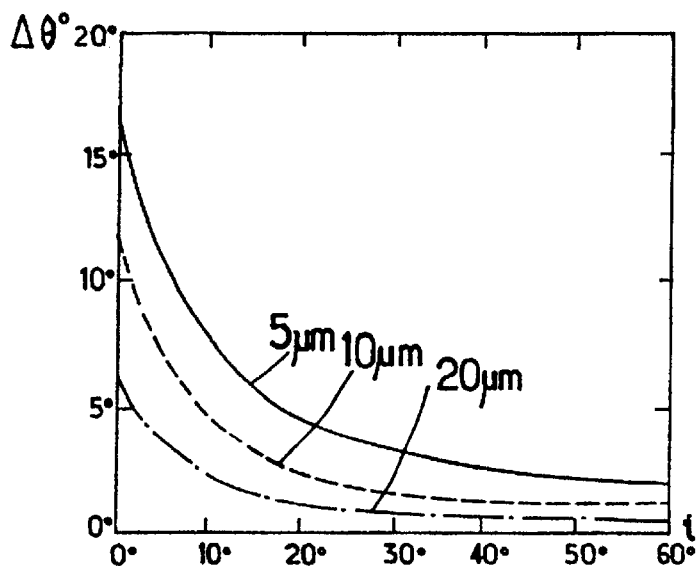
FIG.:1
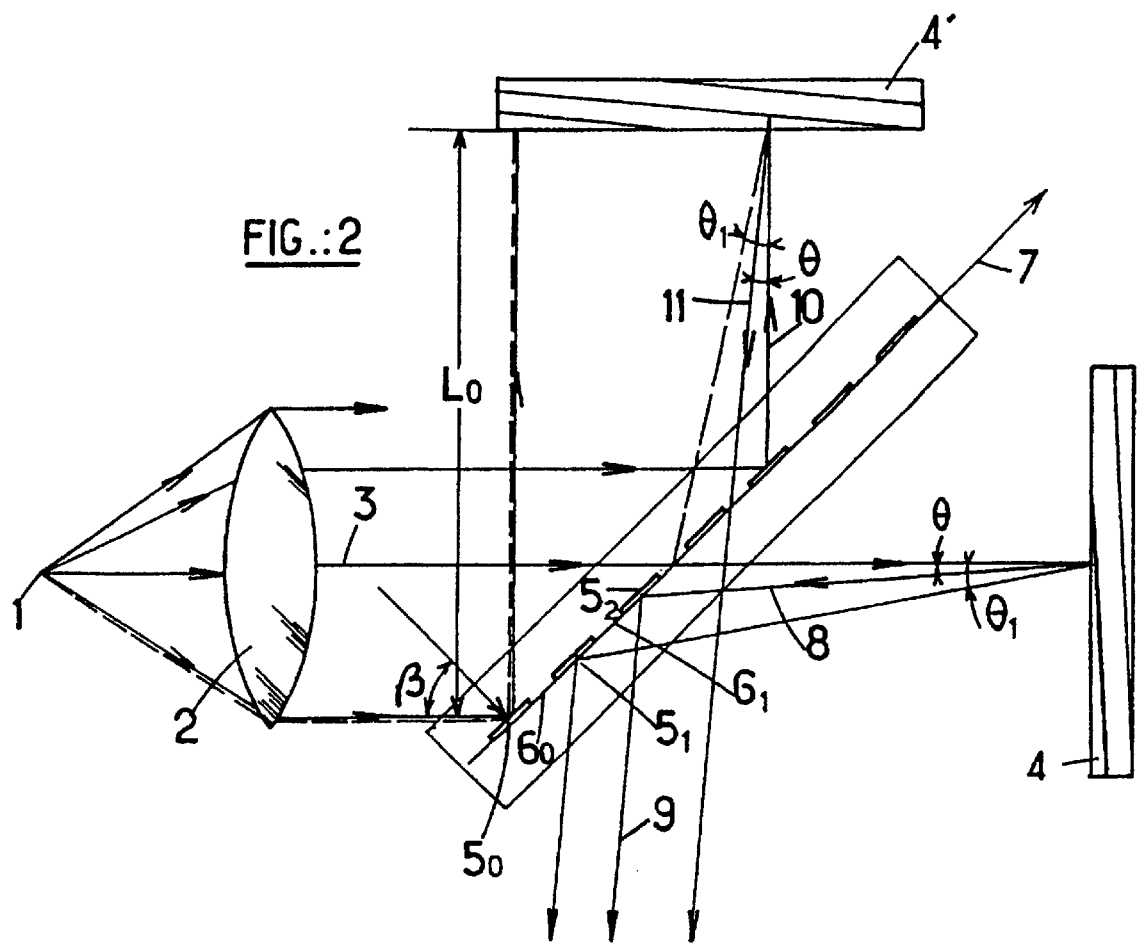
FIG.:2

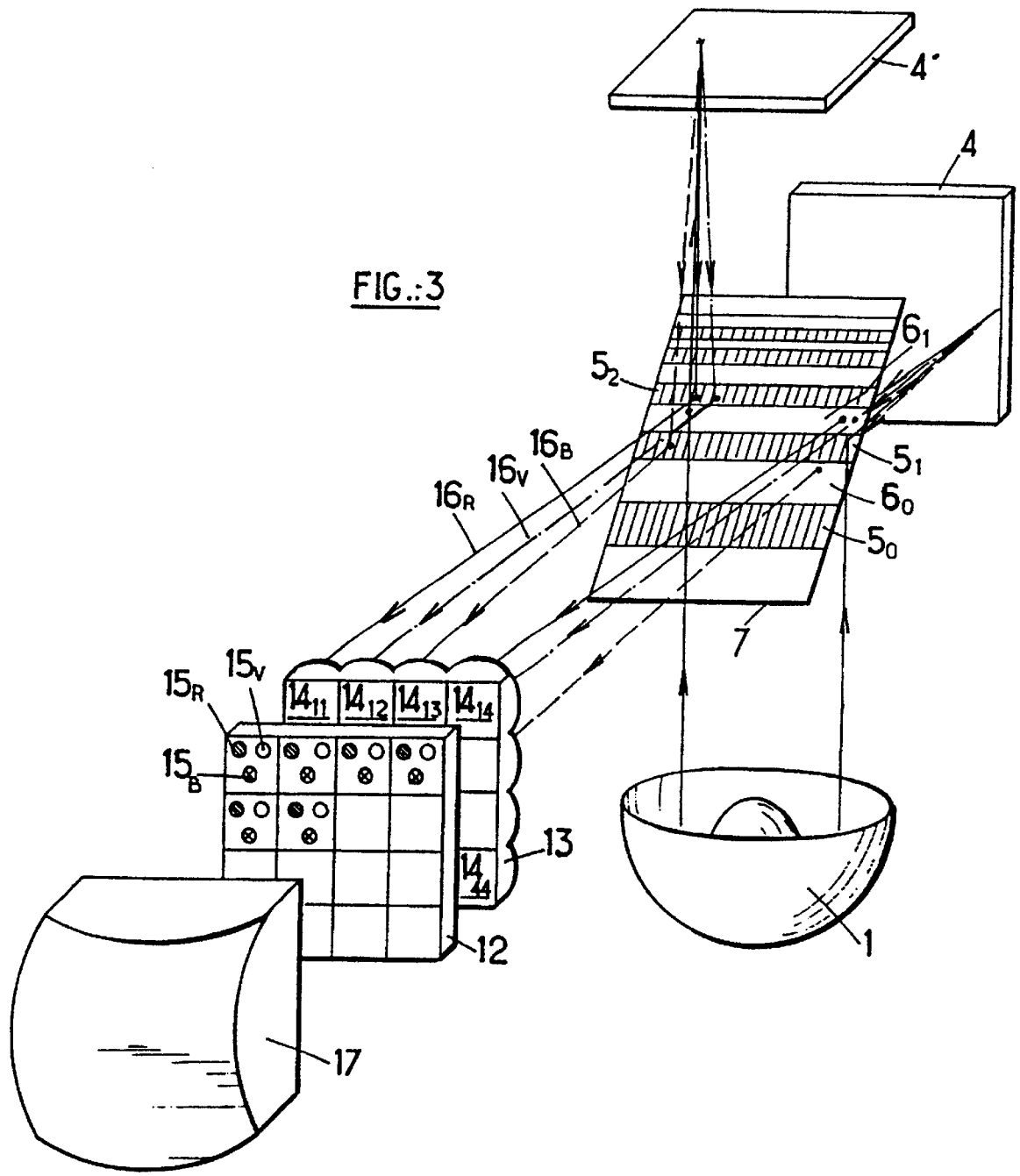

HOLOGRAPHIC DEVICE FOR FORMATION OF LIGHT BEAMS WITH PREDETERMINED SPECTRAL COMPOSITIONS AND PROJECTOR OF VIDEO IMAGES CONTAINING SUCH A DEVICE

The present invention relates to a holographic device for formation of at least one light beam with predetermined spectral composition, and more particularly to such a device designed for the projection of video images displayed on a matrix screen with liquid crystal cells.

From the publication entitled "Compact Spatio-Chromatic Single-LCD Projection Architecture" of Loiseaux et al. (publication S7-4 of the conference Asia Display 95 which is held at Hamamatsu (Japan) in 1995), such a device is known, which has a white light source, and a volume phase hologram is illuminated by said source. This hologram is recorded in such a way as to disperse the light continuously from the red to the blue. The resulting spread beam illuminates a grid of cylindrical microlenses with a variable incidence which depends on the wavelength. In the focal plane of each microlens, the spectrum of the incident light is spread spatially over three columns of cells facing it. The dispersing power of the hologram, the focal distance, and the grid pitch of the microlenses are chosen so that the chromatic contents of the light illuminating each of the three columns of cells facing each microlens corresponds to the red, green, and blue parts of the spectrum, respectively. The cells are liquid crystal cells forming part of a matrix screen of such cells. Three cells are associated with each image element, or pixel, of an image displayed on this screen. They control the transmission, or the lack of transmission, of the light received from the hologram to an objective that projects an enlarged image of the image displayed on the screen onto an opaque or translucent observation surface. Such a device makes it possible to increase the fraction of the light coming from the source that is received by the cells of the liquid crystal screen, and therefore the luminance of the image projected onto the observation surface, in comparison with that obtained with video image projection devices of conventional design, which have matrices of light filters attached to the liquid crystal screen.

The device described in the aforementioned publication can only be used with liquid crystal screens in which the cells corresponding to red, green and blue components of a pixel of the image are aligned perpendicular to the direction of alignment of the cylindrical microlenses of the grid. This device therefore cannot be used when the cells of such a triplet are arranged at the vertices of a triangle, for example, as is ordinarily the case.

Also known from International Patent Application No. WO 92/09915 is a device for lighting a trichromatic liquid crystal screen for the projection of an image displayed on this screen. This device has three assemblies of prisms and holograms. The holograms are illuminated at an incidence of 45° for which their angular selectivity is high. Each of the assemblies is associated with one of the monochromatic components of the image, and a system of mirrors illuminates the liquid crystal screen with the radiation coming from the three assemblies. The light processed by these three assemblies comes from a single source which must emit a beam with low divergence. This source must then be a point source, which implies a short lifetime and a limited power. Furthermore, the light passing through the three assemblies also passes through numerous surfaces and therefore undergoes losses due to stray reflections on the holograms and on the faces of the prisms. Finally, the assembly described is bulky and therefore difficult to integrate in a video image projection device intended for the greater public.

The present invention therefore aims to produce a holographic device for formation of at least one light beam with predetermined spectral composition, designed particularly to make possible the projection of trichromatic images displayed on a matrix screen with liquid crystal cells, such that this device does not have the disadvantages of the devices of the prior art described above. To do this, this device must be able to use effectively the light energy of a real white light source, which is not a point source, and must be designed in such a way as to minimize the light losses by reflection or diffusion while having a small space requirement, making it easy to integrate in a video image projector.

The present invention also aims to produce such a device which is compatible with a matrix screen with liquid crystal cells in which the cells corresponding to a pixel of the image which is displayed are not aligned and are arranged at the vertices of a triangle, for example.

These aims of the invention, as well as others which will appear upon reading of the description which follows, are accomplished with a holographic device for formation of at least one light beam with predetermined spectral composition. This device is remarkable in the fact that it includes a) a flat mirror formed by adjacent areas which are alternately transparent and reflecting, b) at least identical first and second reflection holograms, each delivering at least one diffracted beam with said spectral composition, c) a light source for illuminating said holograms at a roughly normal incidence by the intermediary of said mirror. Said holograms are arranged symmetrically with respect to the plane of said mirror, in such a way as to be illuminated by the intermediary of the transparent and reflecting areas, respectively, of the mirror and in such a way that the beams diffracted by the first and second holograms are reflected and transmitted, respectively, by the reflecting and transparent areas, respectively, of the mirror, in order to be combined into a continuous light beam with said spectral composition, formed at the outlet of the device.

As will be seen further on, this arrangement allows one to take advantage of the low angular selectivity of the reflection holograms, particularly at the normal incidence of the radiation illuminating said hologram. This low selectivity allows one to use more effectively the quantity of light coming from the source used by the holograms, in particular when such source is extended, that is to say, not a point source.

According to one embodiment of the device according to the invention, a part of the beam emitted by the source, transmitted or reflected by the mirror, and illuminating the hologram, is diffracted by the hologram by an angle such that it ensures the reflection or transmission, respectively, of the diffracted beam by the areas of the mirror adjacent to those that transmitted or reflected said part, respectively.

According to a first variant, each of the holograms forms at least two diffracted beams, each of which has a predetermined spectral composition. The angles of diffraction of the two beams are such that the traces of the central rays of these beams in the plane of the mirror are on the axis of the same area of the mirror.

According to a second variant, each of the holograms also forms a third diffracted beam with a predetermined spectral composition. The angle of diffraction of this third beam is such that the trace of its central ray in the plane of the mirror is on the axis of the area of the mirror closest to that of the same nature (reflecting or transparent, respectively) containing the traces of the central rays of the first two beams.

The device according to the invention can be applied to a projector of video images displayed on a matrix screen with liquid crystal cells attached to a grid of optical microlenses arranged in order to focus each at least one beam of radiation with predetermined spectral composition on a corresponding cell of the screen. The projector has a holographic device according to the invention for illuminating the lenses of the grid with at least one light beam with predetermined spectral composition.

Other characteristics and advantages of the present invention will appear upon reading the following description and upon examining of the appended drawing in which:

FIG. 1 is a graph representing, for a reflection hologram, the variations of its angular selectivity as a function of the angle of incidence of a light beam illuminating the hologram, this graph is useful for explaining the functioning of the device according to the present invention, FIG. 2 is a diagram in axial section of the device according to the invention, and FIG. 3 is a diagram in perspective of a video image projector equipped with the device according to the invention.

Reference is made to FIG. 1 of the appended drawing in which it appears that the angular selectivity $\Delta\theta$ (angular separation with respect to the Bragg incidence, in which the efficiency of a reflection hologram is lowered by 50%), is a function, on the one hand, of the optimal angle of incidence i of the beam illuminating the hologram, and on the other hand, of the thickness of the film in which said hologram is recorded. In this graph, it appears that the angle $\Delta\theta$ is maximum when the beam is normal (i=0°) to the plane of the hologram. For a hologram with a thickness of 10 $\mu$m, $\Delta\theta$ is then on the order of approximately 12°. In practice, this means that the efficiency of the hologram remains high when the angle of incidence of the radiation illuminating the hologram does not diverge from the normal by an angle greater than 12°. One sees that this tolerance is particularly beneficial when, as is always the case, the beam illuminating the hologram comes from a real nonpoint radiation source and therefore has an appreciable divergence.

Upon examination of FIG. 1, one observes also that when the incidence of the beam illuminating the hologram diverges greatly from the normal, the angle $\Delta\theta$ decreases greatly. Thus, with the incidence i=45°, corresponding to that used in the device in the aforementioned Patent Application No. WO 92/09915, the angular selectivity is characterized by an angle $\Delta\theta$ of approximately 2°, for a hologram with a thickness of 10 $\mu$m. With this incidence, it is then necessary, in order to form the reconstruction beam, to use a source that is much less extended and therefore much less powerful than when one operates with normal incidence. The plotting of the spectral selectivity of the hologram as a function of the incidence of the beam also shows that it does not vary appreciably when one goes from i=45° to normal incidence. These observations are used in the device according to the invention, which will now be described with reference to the examination of FIG. 2.

This figure diagrammatically represents light source 1, which cannot be a point source, the radiation coming from this source being collimated by lens 2, axis 3 of the collimated beam illuminating reflection hologram 4, after passage between areas $5_1, 5_2$, etc . . . in the form of strips, which are reflecting on both sides and each inserted between transparent areas $6_1, 6_2$, etc . . . in the form of strips of a flat mirror formed by a transparent support on which said reflecting strips are attached. The reflecting strips can also be located between two transparent support plates whose external surfaces can receive an antireflection treatment. The lines of demarcation of strips $5_i$ and $6_i$ are straight and perpendicular to the plane of FIG. 2.

According to the invention, the surface of hologram 4 is normal to axis 3 of the beam coming from source 1. Hologram 4 is recorded in such a way that a part of the light beam, in this case in the form of partial beams that pass through transparent strips $6_i$ give rise to diffracted partial beams, which are inclined by an angle of diffraction $\theta$ with respect to the normal to the surface of the hologram. The angle $\theta$ is chosen in such a way that each diffracted partial beam is picked up by a side of a reflecting strip $5_i$ of mirror 7 adjacent to transparent strip $6_i$ through which the partial beam passed that was incident on the hologram that gives rise to this diffracted partial beam.

The diffracted partial beams parallel to the direction of axis 8 of the central partial beam (see FIG. 2) are then sent back by strips $5_i$ of mirror 7 in direction 9, towards a utilization apparatus (not represented), for example, a matrix screen with liquid crystal cells, as will be seen further on.

It appears now that the device according to the invention has the following advantageous characteristics. On one hand, it makes optimal use of the light energy emitted by nonpoint source 1 due to the normal incidence of beam 3 on the hologram, for reasons mentioned above in connection with FIG. 1. On the other hand, the zero-order beam reflected normally by hologram 4 returns directly to source 1, through transparent areas 6, of mirror 7 in the form of strips, without stray reflection of this beam in the device, which can contaminate useful beam 9.

Furthermore, its space requirement is considerably less than that of a conventional device with no mirror 7 in the form of strips. In effect, in the latter, if one wishes to keep the advantages of the low angular selectivity of the holograms illuminated at normal incidence, it is only possible to use diffracted beam 8 when it diverges sufficiently from axis 3 so that one can arrange on beam 8 a utilization apparatus such as a matrix screen with liquid crystal cells, for example. The distance separating source 1 from hologram 3 must then be large. Due to the mirror in the form of strips according to the invention, the diffracted beam is sent back in the direction of axis 9, greatly inclined with respect to axis 3. It is then possible with this beam to illuminate a matrix screen with liquid crystal cells arranged very close to the mirror, since the distance separating source 1 and the hologram can be reduced. These two factors allow one to produce a very compact device that is compatible, for example, with an installation in a video image projector intended for the greater public, as will be seen subsequently.

It is clear that hologram 4 of the device of FIG. 2 allows one to form and direct, in the direction of axis 9, only discontinuous partial beams diffracted by hologram 4. In numerous applications and particularly in that concerning the projection of video images using a matrix screen with liquid crystal cells, it is necessary to have a continuous diffracted beam. To do this, according to the invention, one installs in the device a second hologram 4' identical to hologram 4. The two holograms are arranged in planes that are symmetrical with respect to the plane of mirror 7 in the form of strips. The edge of the dihedron delimited by the planes of these holograms is parallel to the lines of demarcation of the transparent and reflecting strips of the mirror. Thus, as represented in FIG. 2, the part of beam 3 that does not illuminate hologram 4 is reflected by strips $5_i$ towards hologram 4' in direction 10. Hologram 4' in return emits diffracted partial beams in the direction 11. These diffracted partial beams pass through transparent strips $6_i$ of mirror 7 in order to fill in the spaces between the reflected partial beams in direction 9, parallel to direction 11. On sees that in is way, the diffracted light beam leaving the device is completely continuous and has the same predetermined spectral composition everywhere.

In FIG. 2, mirror 7 is represented inclined 45° with respect to axis 3 of the beam coming from source 1. Holograms 4 and 4' are then arranged in planes perpendicular to one another. It is clear, however, that the inclination β of mirror 7 with respect to axis 3 could be different from 45° as long as the condition of normal incidence of the beams coming from source 1 on holograms 4,4' is complied with.

In FIG. 2, it appears that the distance measured along a ray diffracted by either of holograms 4,4' between its point of emission on the hologram and its point of reflection or transmission on mirror 7 varies in the cross section of a beam diffracted through the plane of the figure. Consequently the width of strips $5_i$ and $6_i$ cannot be constant, taking into account the constancy of the angle of diffraction θ. It is demonstrated that the widths $l(5_i)$ and $l(6_i)$ of strips $5_i$ and $6_i$ are given by the following equations:

$$l(5_i) = \frac{L_0 \cdot tg\theta}{(1 + tg\theta \cdot tg\beta)^{2i+1}} \cdot \frac{1}{\cos\beta}$$

$$l(6_i) = \frac{L_0 \cdot tg\theta}{(1 + tg\theta \cdot tg\beta)^{2(i+1)}} \cdot \frac{1}{\cos\beta}$$

in which $L_O$ is the maximum distance separating the mirror from any of the holograms, i the index of the strip in consideration, increased in increments from strips $5_O$ and $6_O$ located a distance $L_O$ from the holograms, θ the angle of diffraction measured in projection in the plane of the figure, and β the angle of incidence of beam 1 on mirror 7, equal to the inclination of this mirror with respect to the axis of this beam.

The device described above allows one to form several light beams of different spectral compositions, for example, beams of red, green and blue light, which can be used in the application that will be mentioned in connection with FIG. 3. To do this, source 1 can emit white light, and holograms 4,4' can be recorded in such a way as to diffract this light according to three beams of red, green and blue light, for example. These beams are diffracted into directions that coincide in when projected in the plane of the figure but that diverge when projected in a plane perpendicular to that of the figure (that of mirror 7, for example). One sees that the partial beams of the three colors are reflected, or pass through, the same strips of mirror 7. When three output beams with coplanar axes are thus obtained, it is possible to correctly illuminate the cells of a matrix screen with liquid crystals in which an image pixel consists of three aligned cells respectively controlling the transmission of red, green or blue illuminate, respectively, towards a surface for projection of an enlarged image of that borne by the screen with liquid crystal cells.

However, this arrangement of beams is no longer suitable when said cells are no longer aligned but arranged, for example, at the vertices of a triangle according to the configuration called "Δ". The device according to the present invention can be adapted to the illumination of a screen of cells arranged according to this configuration, as will be explained in connection with the examination of FIG. 3, which represents the optical part of a projector of color video images displayed on a screen with liquid crystal cells. The projector is improved by incorporation of the device according to the invention.

The projector of FIG. 3 essentially includes matrix screen 12 with liquid crystal cells, which is attached to grid 13 of microlenses $14_{ij}$ intended to focus light beams $16_R, 16_V, 16_B$, which are respectively red, green, and blue, on corresponding cells of screen 12. Three liquid crystal cells such as $15_R, 15_V, 15_B$ grouped in a Δ configuration together define a color image element (pixel). These cells selectively control the passage through them of light beams $16_R, 16_V, 16_B$ respectively towards objective 17 for projection of the light transmitted by screen 12 onto an opaque or translucent surface (not represented) where the enlarged image forms, which is observed by the users of the projector.

This projector is equipped with a device for forming three beams of red, green and blue radiation according to the invention, in which one finds light source 1, holograms 4 and 4', and mirror 7 of the device of FIG. 2. On mirror 7 of FIG. 3, the variation of the width of strips $5_i$ and $6_i$ of the mirror is shown diagrammatically. The width is progressively decreased when one moves over the mirror towards the areas of it that are closest to holograms 4,4', in accordance with the equations given above.

As diagramed in FIG. 3 for cells $15_R, 15_V, 15_B$, for example, it appears that microlens $14_{11}$ of grid 13 focuses light beams $16_R, 16_V, 16_B$ on cells $15_R, 15_V, 15_B$, respectively. The axes of beams $16_R$ and $16_V$ are located in the same plane cutting the same strip $5_2$ of the mirror, while beam $16_B$ comes from strip $5_1$ of the same nature, closest to strip $5_2$. Transparent strips $6_i$ obviously play the same role as reflecting strips $5_i$, as illustrated in the figure in connection with microlens $14_{14}$ of grid 13. This result is obtained simply by giving the angle of diffraction $\theta_1$ (see FIG. 2) of the blue light sent back by holograms 4,4' a different value from that given to the angles of diffraction of the red and green diffracted beams, so that beam $16_B$, for example, is reflected on strip $5_1$ while beams $16_R, 16_V$, are reflected on strip $5_2$. One thus sees that in this way, the same microlens, $14_{11}$, for example, focuses red, green and blue light beams on three cells $15_R, 15_V, 15_B$ arranged in Δ configuration, as represented in FIG. 3. Therein lies an important advantage of the device according to the invention over the device described in the publication of the conference Asia Display 95 mentioned above, which can only be used with matrix screens in which the cells corresponding to the same image element are arranged in a line. This arrangement is furthermore compatible with another embodiment of the device according to the invention, as seen above.

The formulas given above show that the width $l(5_i)$ or $l(6_i)$ of the strips of mirror 7 is a function of the angle of diffraction. When one uses at least two values of this angle, as is the case when the cells are in Δ configuration, the calculations then give two values of widths for each strip of the mirror. One will choose for this strip an intermediate value between the two calculated values, ensuring minimal deterioration of the performance of the device.

It now appears that the device according to the invention provides the advantages sought alter, namely, effective use of the light energy emitted by an extended source, that is to say a nonpoint source, great compactness ensuring its compatibility with video image projectors intended particularly for the greater public, and elimination of the stray light due to zero-order beams of the holograms used, by sending this light directly back to the source. Furthermore, the device according to the invention, which eliminates the filter grids conventionally used for the spectral separation of the light passing through the cells of the matrix screen, has a high light efficiency, which ensures the formation of bright and saturated color video images using a projector equipped with this device.

Of course, the invention is not limited to the embodiments described and represented, which were only given as examples. Thus, the mirror in the form of strips can be replaced by a mirror with two distributions of respectively transparent and reflected areas, imbricated together according to a checkerboard formation corresponding in cross section with the arrangement represented in FIG. 2. The areas of the mirror in the form of strips and the partial beams described above then become discontinuous perpendicular to the plane of FIG. 2 with modification of their properties and their dimensioning when projected in the plane of the figure.

One could also, for example, make use of the high spectral selectivity of the holograms of the device according to the invention that is possible and of the low angular selectivity of these holograms for collecting and processing a light signal coming from a far and mobile source such as a laser radiation reflector mounted on a satellite.

What is claimed is:

1. A holographic device for formation of at least one light beam with predetermined spectral composition, characterized by the fact that it includes:
   a) flat mirror (7) formed by adjacent areas which are alternately transparent ($6_i$) and reflecting ($5_i$),
   b) at least identical first (4) and second (4') reflection holograms, each delivering at least one diffracted beam with said spectral composition,
   c) light source (1) for illumination said holograms (4,4') at roughly normal incidence by the intermediary of said mirror (7), said holograms (4,4' being arranged symmetrically with respect to the plane of said mirror (7), in such a way as to be illuminated by the intermediary of transparent ($6_i$) and reflecting ($5_i$) areas, respectively, of mirror (7), and in such a way that the beams diffracted by first (4) and second (4') holograms are reflected and transmitted, respectively, by reflecting ($5_i$) and transparent ($6_i$) areas, respectively, of mirror (7), in order to be combined into a continuous light beam with said spectral composition.

2. The device according to claim 1, characterized by the fact that said areas of mirror (7) are in the form of strips ($5_i,6_i$) with lines of demarcation that are straight and parallel to the edge of the dihedron delimited by the planes of holograms (4, 4').

3. The device according to claim 1, characterized by the fact that said transparent and reflecting areas are unbricated in the form of a checkerboard.

4. The device according to any one of claims 1–3, characterized by the fact that mirror (7) is inclined with respect to the axis of the light beam emitted by source (1) by an angle ($\beta$) such that the light beam with said spectral composition leaving the device is appreciably inclined with respect to the axis of the beam emitted by source (1).

5. The device according to any one of claims 1–3, characterized by the tact that it has lens (2) for collimating the light coming from source (1).

6. The device according to any one of claims 1–3, characterized by the fact that a part of the beam emitted by source (1), transmitted or reflected by mirror (7), is diffracted by hologram (4,4'), which it illuminates at angle ($\theta$) such that it is reflected or transmitted, respectively, by area ($5_i,6_i$) of mirror (7) adjacent to that which transmitted or reflected said part, respectively.

7. The device according to claim 6, characterized by the fact that each of holograms (4,4') forms at least two diffracted beams, each having a predetermined spectral composition, the angles of diffraction of the two beams being such that the traces of the central rays of said beams in the plane of mirror (7) are on the axis of the same area of the mirror.

8. The device according to claim 7, characterized by the fact that each of holograms (4,4') also forms a third diffracted beam with a predetermined spectral composition, the angle of diffraction ($\theta_1$) of this third beam being such that the trace of its central ray in the plane of mirror (7) is on the axis of the area of the mirror closest to that of the same nature containing the traces of the central rays of the first two beams.

9. The device according to claim 7, characterized by the fact that reflecting ($5_i$) and transparent ($6_i$) strips of mirror (7) have widths $1(5_i)$ and $1(6_i)$ such that:

$$l(5_i) = \frac{L_0 \cdot tg\theta}{(1 + tg\theta \cdot tg\beta)^{2i+1}} \cdot \frac{1}{\cos\beta}$$

$$l(6_i) = \frac{L_0 \cdot tg\theta}{(1 + tg\theta \cdot tg\beta)^{2(i+1)}} \cdot \frac{1}{\cos\beta}$$

in which $L_O$ is the maximum distance separating mirror (7) from any of the holograms, i the index of the strip in consideration, increased in increments from strips ($5_O$) and ($6_O$) located a distance $L_O$ from the holograms, $\theta$ the angle of diffraction measured in projection in the plane perpendicular to that of mirror (7), and $\beta$ the angle of incidence of source (1) on this mirror 7.

10. The device according to claim 8, characterized by the fact that reflecting ($5_i$) and transparent ($6_i$) strips of mirror (7) have intermediate widths $1(5_i)$ and $1(6_i)$ between those given by the formulas of claim 7 for angles ($\theta$) and ($\theta_1$) respectively.

11. A projector of video images displayed on matrix screen (12) with liquid crystal cells ($15_R,15_V,15_B$) attached to grid (13) of optical microlenses arranged in order to focus each at least one beam of radiation ($16_R16_V16_B$) with predetermined spectral composition on corresponding cell ($15_R,15_V,15_B$) of screen (12), characterized by the fact that it has a holographic device according any one of claims 1–3 for illuminating lenses ($14_q$) of the grid with at least one light beam with predetermined spectral composition.

12. the projector according to claim 11, characterized by the fact that matrix screen (12) consists of groups of aligned cells ($15_R,15_V,15_B$), each group corresponding to an image element of the image displayed on screen (12).

13. The projector according to claim 11, characterized by the fact that matrix screen (12) consists of groups of non-aligned cells ($15_R, 15_V,15_B$), each group corresponding to an image element of the image displayed on the screen.

14. The projector according to claim 11, characterized by the fact that the cells ($15_R,15_V,15_B$) of each group are arranged in a "$\Delta$" configuration.

15. The projector according to claim 11, characterized by the fact that the holographic device forms three beams of red, green, and blue radiation, respectively.

* * * * *